US011876319B2

(12) United States Patent
Hermsen

(10) Patent No.: US 11,876,319 B2
(45) Date of Patent: Jan. 16, 2024

(54) HYDRAULIC ELECTRICAL CONNECTOR ASSEMBLY

(71) Applicant: Varex Imaging Nederland B.V., Doetinchem (NL)

(72) Inventor: Edo Hermsen, Dinxperlo (NL)

(73) Assignee: Varex Imaging Nederland B.V., Doetinchem (NL)

( * ) Notice: Subject to any disclaimer, the term of this patent is extended or adjusted under 35 U.S.C. 154(b) by 0 days.

(21) Appl. No.: 17/335,959

(22) Filed: Jun. 1, 2021

(65) Prior Publication Data

US 2022/0376429 A1 Nov. 24, 2022

(30) Foreign Application Priority Data

May 21, 2021 (EP) .................................... 21175455

(51) Int. Cl.

*H01R 13/40* (2006.01)
*H01R 13/52* (2006.01)
*H01R 13/00* (2006.01)

(52) U.S. Cl.

CPC ....... *H01R 13/5202* (2013.01); *H01R 13/005* (2013.01)

(58) Field of Classification Search

CPC .......................... H01R 13/005; H01R 13/5202
USPC .......................................................... 439/587
See application file for complete search history.

(56) References Cited

U.S. PATENT DOCUMENTS 7,097,515 B2 8/2006 Siddiqi et al.
7,500,859 B2 * 3/2009 Dubranna ............ H01R 13/523 439/140
7,695,301 B2 * 4/2010 Mudge, III .......... H01R 13/533 439/732
9,136,638 B2 * 9/2015 Billault ................ G02B 6/3816
9,172,175 B2 * 10/2015 Spencer ................. H02G 15/06
(Continued)

FOREIGN PATENT DOCUMENTS

EP 0235365 A2 9/1987
EP 0235365 A3 9/1987

OTHER PUBLICATIONS

EP Search Report for EP Application No. 21175455.1 dated Oct. 28, 2021, including 1503PA, 1507, 1707.

*Primary Examiner* — Abdullah A Riyami
*Assistant Examiner* — Vladimir Imas
(74) *Attorney, Agent, or Firm* — Laurence & Phillips IP Law

(57) ABSTRACT

Some embodiments include an assembly, comprising: a first connector housing including an opening and a first electrical contact a second connector housing including a portion insertable into the opening and a second electrical contact electrically interfaceable with the first electrical contact a seal configured to form a sealable fluid chamber with the first connector housing and the second connector housing when the portion of the second connector housing is inserted into the opening of the first connector housing and a sealable vent coupled to the sealable fluid chamber when the portion of the second connector housing is inserted into the opening of the first connector housing wherein, when the sealable fluid chamber is formed: the portion of the second connector housing is movable within the opening; and the volume of the sealable fluid chamber changes as the portion of the second connector housing moves within the opening.

20 Claims, 19 Drawing Sheets

(56) References Cited

U.S. PATENT DOCUMENTS

| | | | | |
|---|---|---|---|---|
| 9,197,006 | B2 * | 11/2015 | Hack | H01R 13/523 |
| 9,263,824 | B2 * | 2/2016 | Cairns | H01R 24/38 |
| 9,583,868 | B2 * | 2/2017 | McIntosh | H01R 13/6581 |
| 9,753,230 | B2 | 9/2017 | Burrow et al. | |
| 9,780,482 | B2 * | 10/2017 | Lewin | H01R 13/5219 |
| 10,236,623 | B1 * | 3/2019 | Cairns | H01R 13/521 |

* cited by examiner

HYDRAULIC ELECTRICAL CONNECTOR ASSEMBLY

High voltage electrical connector assemblies may use dielectric oil as an insulating medium. Voids, air pockets, or the like within the connector assembly may result in arcing or other effects that may eventually result in a failure of the connector assembly.

DETAILED DESCRIPTION

Some embodiments relate to hydraulic connector assemblies. Connector assemblies may be used to form electrical connections to electronic devices. High voltages, such as voltages in the range of 1 kilovolt (kV) to 200 kV or more may be applied through such electrical connections. While the applied voltage may be a direct current (DC) or alternating current (AC) voltage, in other embodiments, the voltages may be pulsed high voltages. In some embodiments, a high power may be transmitted through the connector assemblies.

High AC or DC voltages and pulsed high voltages may lead to arcing, particle discharge, or the like. Dielectric oil may be used to reduce the probability of such events; however, air voids within the dielectric oil may still allow such events to occur. In addition, the voids within the connector assembly may expand and contract due to temperature changes. This movement may cause erosion of the various structures of the connector assemblies, such as dielectric materials. The erosion may increase the probability that arcing may occur. In some embodiments, a hydraulic connector assembly may reduce the probability of such events by reducing voids.

Figure 1A:
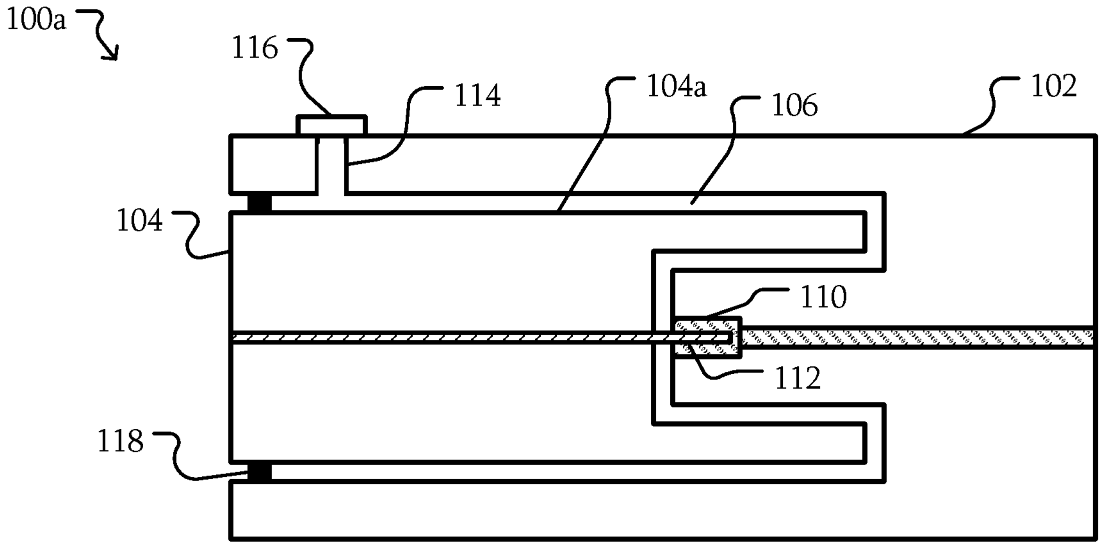
FIG. 1A is a block diagram of a connector assembly according to some embodiments.
Figure 1B:
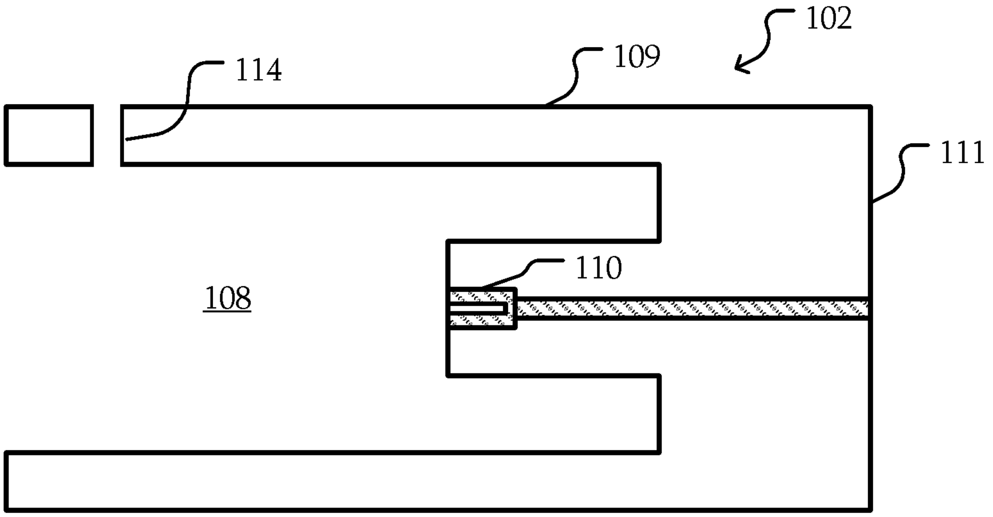
FIGS. 1B and 1C are block diagrams of connector housings of the connector assembly of FIG. 1A according to some embodiments.
Figure 1C:
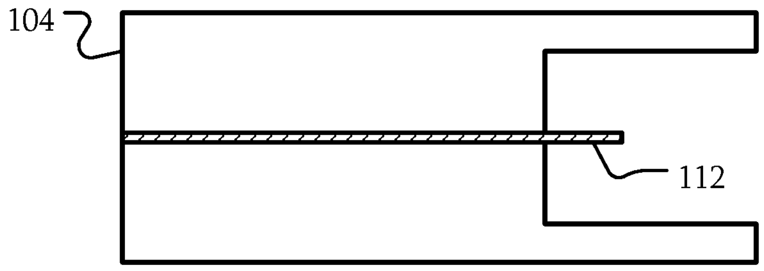
Figure 1D:
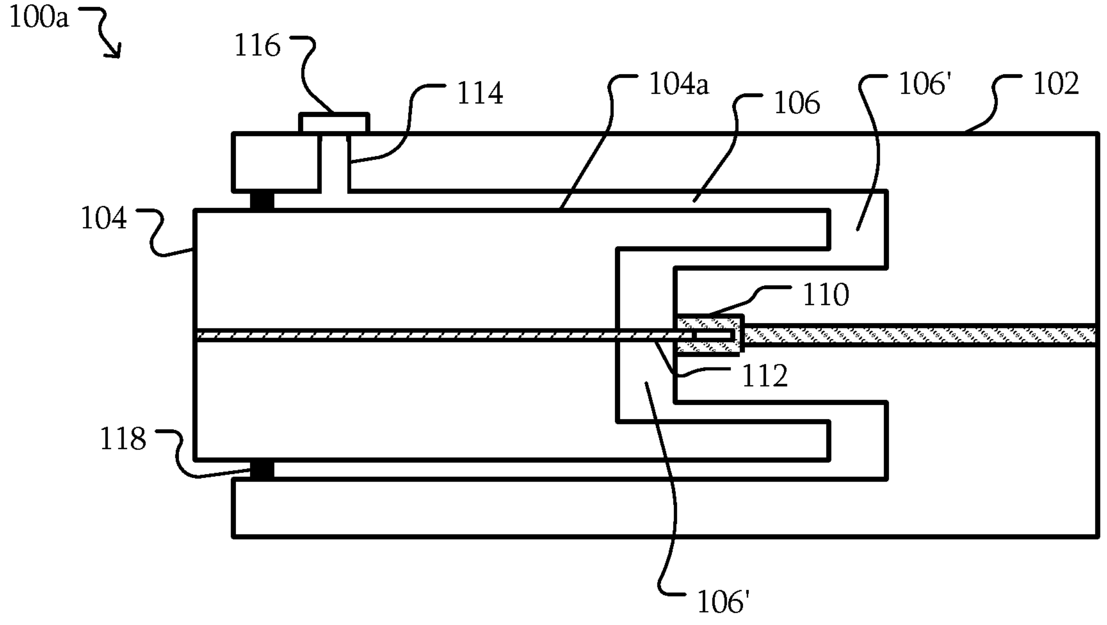
FIG. 1D is a block diagram of the connector assembly of FIG. 1A with a connector housing in a different position according to some embodiments.
Figure 1E:
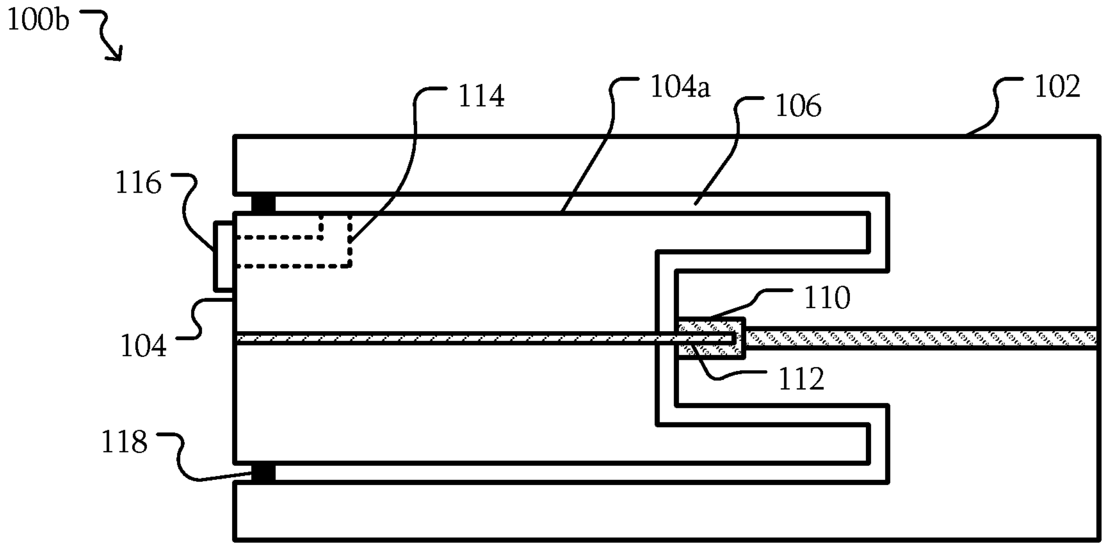
FIG. 1E is a block diagram of a connector assembly with a different sealable vent according to some embodiments.

FIG. 1A is a block diagram of a connector assembly according to some embodiments. FIGS. 1B and 1C are block diagrams of connector housings of the connector assembly of FIG. 1A according to some embodiments. FIG. 1D is a block diagram of the connector assembly of FIG. 1A with a connector housing in a different position according to some embodiments. FIG. 1E is a block diagram of a connector assembly with a different sealable vent according to some embodiments. Referring to FIGS. 1A-1D, in some embodiments, the connector assembly 100*a* includes a first connector housing 102 and a second connector housing 104. In some embodiments, the first connector housing 102 is a plug and the second connector housing 104 is a receptacle. In other embodiments, the first connector housing 102 is a receptacle and the second connector housing 104 is a plug. The first connector housing 102 includes an opening 108 and a first electrical contact 110. The opening 108 is bounded by sidewalls 109 and a base 111.

The second connector housing 104 includes a portion 104*a* insertable into the opening 108. The second connector housing 104 includes a second electrical contact 112 electrically interfaceable with the first electrical contact 110. Although a single first electrical contact 110 and a single second electrical contact 112 are used as examples, in other embodiments, multiple electrical contacts may be present in both the first connector housing 102 and the second connector housing 104. Although the first connector housing 102 and the second connector housing 104 are illustrated as having a particular shape or configuration, in other embodiments, the shape or configuration may be different.

Each of the first connector housing 102 and the second connector housing 104 may include a variety of materials such as metal, stainless steel, glass, ceramics, plastics, polyvinyl chloride (PVC), similar materials, combinations of such materials, or the like. In some embodiments, the materials of the first connector housing 102 and the second connector housing 104 may be the same while in others the materials may be similar or different.

The connector assembly 100*a* includes a seal 118 configured to form a sealable fluid chamber 106 with the first connector housing 102 and the second connector housing 104 when the portion 104*a* of the second connector housing 104 is inserted into the opening 108 of the first connector housing 102. The sealable fluid chamber 106 is a chamber capable of being sealed to contain an insulating fluid, such as a dielectric oil. The seal 118 may include a material resistant to the particular insulating fluid. For example, the seal 118 may include rubber, silicone, or other similar materials.

A sealable vent 114 is coupled to the sealable fluid chamber 106 when the portion 104*a* of the second connector housing 104 is inserted into the opening 108 of the first connector housing 102. The sealable vent 114 may be disposed in a variety of locations. In some embodiments, the sealable vent 114 may penetrate the first connector housing 102 as illustrated in FIG. 1A. Here, the sealable vent 114 is disposed in the sidewall 109 of the first connector housing 102; however, the sealable vent 114 may be disposed in other location on the first connector housing 102, such as on the base 111.

The sealable vent 114 may be disposed in structures other than the first connector housing 102. For example, the sealable vent 114 may penetrate the second connector housing 104 as illustrated in FIG. 1E. Regardless, the sealable vent 114 provides access to the sealable fluid chamber 106 while the portion 104*a* of the second connector housing 104 is inserted into the opening 108 of the first connector housing 102. While a single sealable vent 114 has been used as an example, in other embodiments, multiple sealable vents 114 may be coupled to the sealable fluid chamber 106. The sealable vent 114 may be sealed with a seal 116. The seal 116 may take a variety of forms, such as a bleeder screw, a conventional screw, a valve, or the like.

In some embodiments, when the sealable fluid chamber 106 is formed, the portion 104*a* of the second connector housing 104 is movable within the opening 108. The first connector housing 102 and the second connector housing 104 are formed such that the volume of the sealable fluid chamber 106 changes as the portion 104*a* of the second connector housing 104 moves within the opening 108. For example, the second connector housing 104 in FIG. 1D has been moved relative to the second connector housing 104 in FIG. 1A. As a result, the volume of the sealable fluid chamber 106 has increased. In particular, the volume in the portions 106' have increased. While particular portions 106' have been used as an example for a location where the volume has increased, in other embodiments, the changes may be in different locations depending on the configuration of the first and second connector housings 102 and 104.

In some embodiments, the volume of the sealable fluid chamber 106 is less than 10 milliliters (ml), 12 ml, and/or 15 ml. Regardless, this amount may be significantly less than the volume of oil used in other connector assemblies. This relatively reduced volume may improve installation and/or servicing of the connector assembly 100*a* as an amount of oil a user may need to transport, supply, dispose, or the like may be reduced.

As will be described in further detail below, the sealable fluid chamber 106 may be filled with an insulating fluid, such as dielectric oil. Manipulation of the second connector housing 104 relative to the first connector housing 102 may be used to reduce or eliminate air voids within the dielectric oil in the sealable fluid chamber 106. The voids may have a lower breakdown voltage than the fluid, arcing may occur, which may lead to failure of the connector assembly. For example, air may have a breakdown voltage of 1 kilovolts per millimeter (kV/mm) while silicon oil has a 20 kV/mm breakdown voltage. The manipulation to reduce or eliminate the voids may increase reliability and lifetime of the connector assembly.

In some embodiments, when the voids are reduced or eliminated, the second connector housing 104 may be substantially held in in the first connector housing 102 due to hydraulic pressure. For example, if the voids are eliminated, the fluid in the sealable fluid chamber 106 may resist compression and expansion more so than if voids were present.

In some embodiments, the second connector housing 104 may be configured to move to accommodate expansion and contraction of the fluid in the sealable fluid chamber 106. For example, as the fluid in the sealable fluid chamber 106 increases in temperature, the volume may increase slightly or similarly decrease for decreases in temperature. The movable range of the second connector housing 104 within the first connector housing 102 may accommodate this expansion and contraction over the operating range of the connector assembly 100*a*. In some embodiments, the range of movement may be less than 0.2 millimeters (mm) over the operating temperature range. In some embodiments, the movement range of the second connector housing 104 within the first connector housing 102 may eliminate a need for expansion bellows or other similar structures to accommodate changes in the volume of the fluid.

In some embodiments, a low viscosity oil may be used as the insulating fluid. For example, the insulating fluid may include an oil with a viscosity less than about 50 centistokes (cSt).

In some embodiments, the use of a connector assembly as described herein may allow for increased voltages. For example, a conventional connector assembly with dielectric oil may have a maximum rated voltage of 75 kV. However, a similarly sized connector assembly as described herein may have a maximum rated voltage of 100 kV. While particular voltage ratings have been used as examples, in other embodiments, the voltage rating may be different. For example, a connector assembly as described herein may have a maximum rated voltage of 75 kV, but may have a smaller size.

Figure 2A:
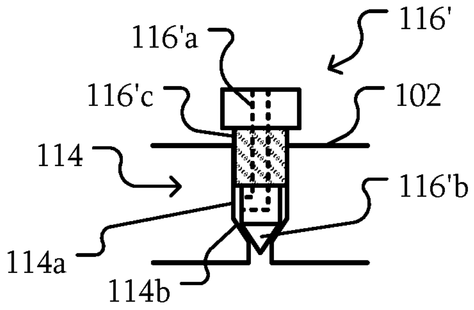
FIGS. 2A and 2B are block diagrams of seals and sealable vents according to some embodiments.
Figure 2B:
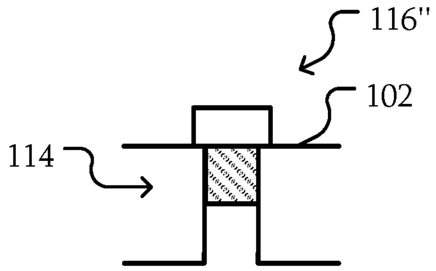

FIGS. 2A and 2B are block diagrams of seals and sealable vents according to some embodiments. Referring to FIG. 2A, in some embodiments, a bleeder screw 116' may be configured to seal the sealable vent 114. The sealable vent 114 may include a threaded portion 114*a* and a conical portion 114*b*. The bleeder screw 116' may include a passage 116'*a*, a conical portion 116'*b*, and a threaded portion 116'*c*. The passage 116'*a* may be configured to allow a fluid to pass in or out of the sealable fluid chamber 106. The conical portion 116'*b* may be configured to mate with the conical portion 114*b* of the sealable vent 114. When mated the conical portions 114*b* and 116'*b* may seal the sealable vent 114.

Referring to FIG. 2B, in some embodiments, a screw 116" may be used to seal the sealable vent 114. For example, when the screw 116" is tightened, the sealable vent 114 may be sealed. When the screw 116" is loosened, the sealable vent 114 may be unsealed and fluid may flow into or out of the sealable fluid chamber 106.

While two structures have been used as examples of structures to seal the sealable vent 114, in other embodiments, the type of structure may be different. In addition, in some embodiments, multiple structures may be present corresponding to multiple sealable vents 114. In addition, other components such as o-rings, washers, or the like may be included as part of a seal 116.

Figure 3A:
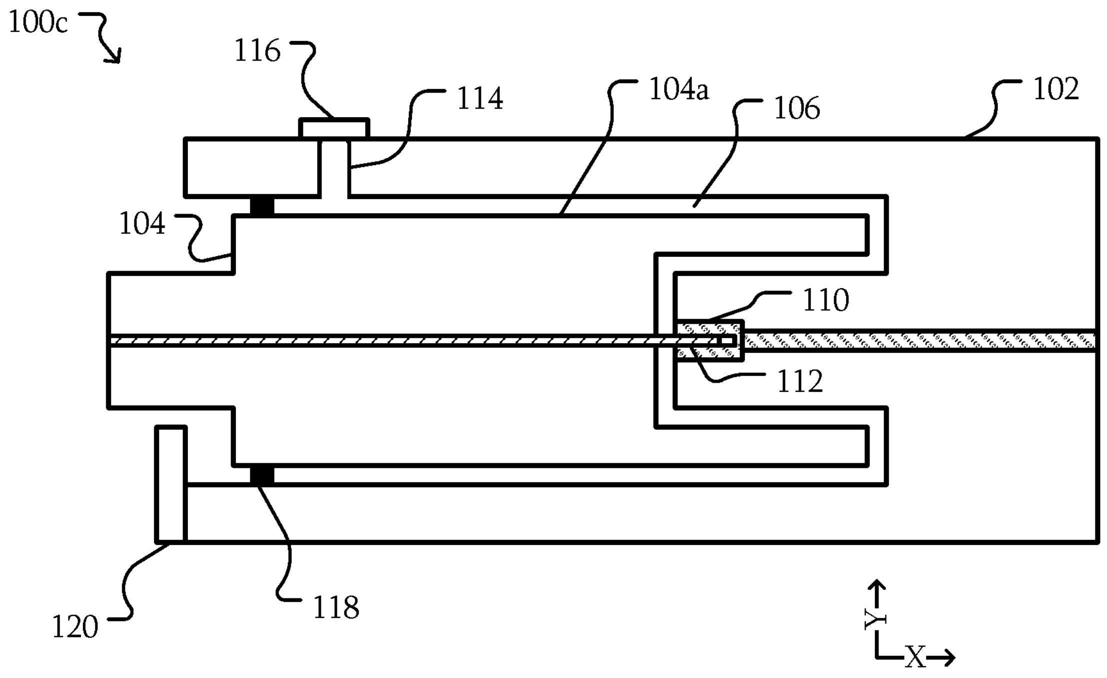
FIGS. 3A-3C are block diagrams of a connector assembly with a mechanical stop according to some embodiments.
Figure 3B:
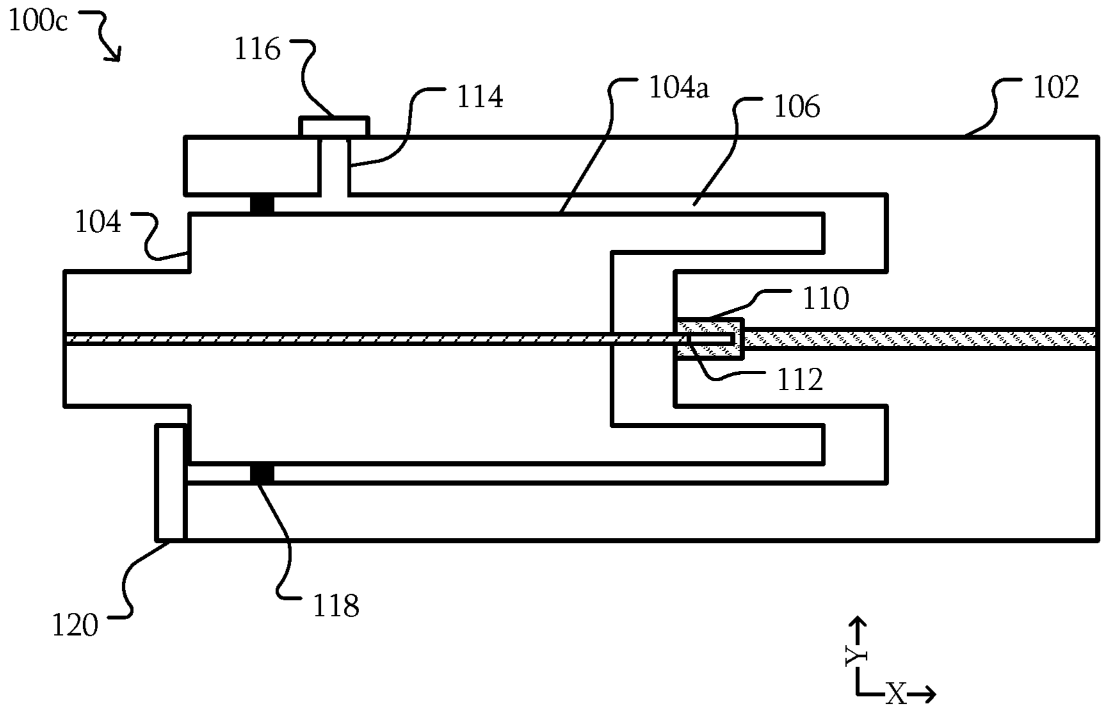
Figure 3C:
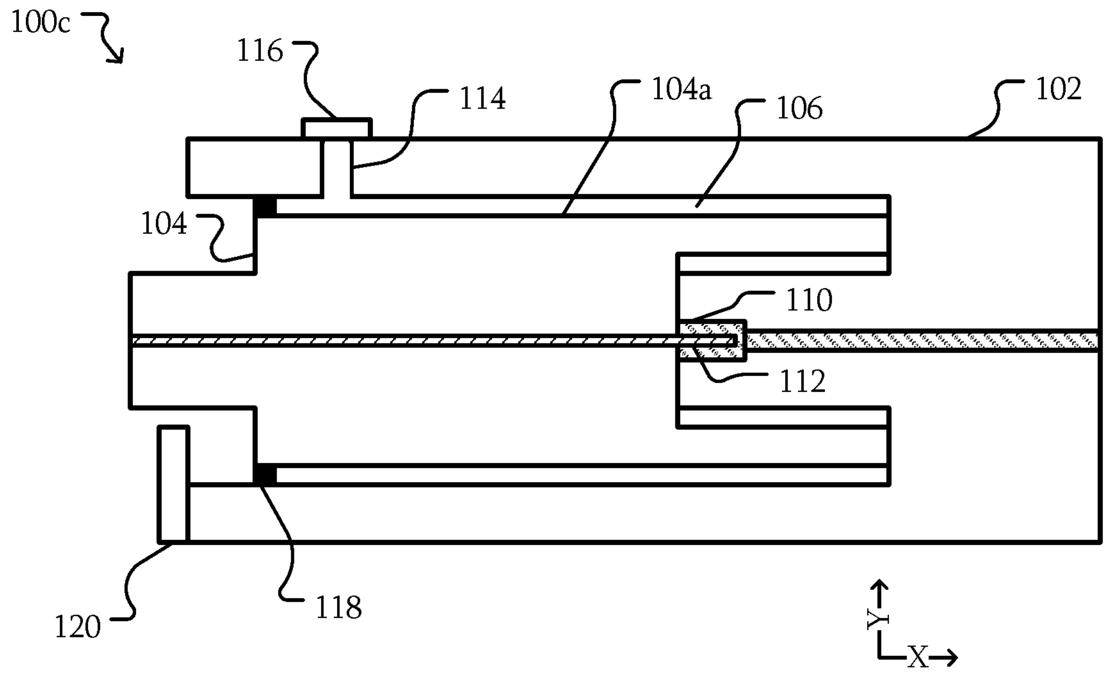

FIGS. 3A-3C are block diagrams of a connector assembly with a mechanical stop according to some embodiments. The connector assembly 100*c* is similar to the connector assemblies 100*a* and 100*b* described above. However, the connector assembly 100*c* includes a mechanical stop 120. The mechanical stop 120 is coupled to the first connector housing 102 such that movement of the portion 104*a* of the second connector housing 104 within the opening 108 is limited by the mechanical stop 120. The mechanical stop 120 may be semi-permanently coupled to the first connector housing 102 with a bolt, pin, or other attachment mechanism.

The sealable fluid chamber 106 is maintained in all positions of the portion 104*a* of the second connector housing 104 within the opening 108 when limited by the mechanical stop 120. In FIG. 3B, the movement of the second connector housing 104 is limited by the mechanical stop 120. In FIG. 3C the movement of the second connector housing 104 is limited by the connector housings 102 and 104. From the position illustrated in FIG. 3B to the position illustrated in FIG. 3C, the sealable fluid chamber 106 may remain sealed. While the sealable fluid chamber 106 may be unsealed through other mechanisms, such as the sealable vent 114, the movement of the second connector housing 104 does not cause the sealable fluid chamber 106 to become unsealed.

A major axis of movement of the portion 104*a* of the second connector housing 104 within the opening 108 may be aligned with an axis of insertion of the portion 104*a* of the second connector housing 104 into the opening 108. In this example, a major axis of movement is in the X direction. In some embodiments, the first connector housing 102 and the second connector housing 104 are configured such that rotation of the portion of the second connector housing within the opening changes the volume of the sealable fluid chamber. The movement may be translation along the X direction and/or rotation about the X direction.

Figure 3D:
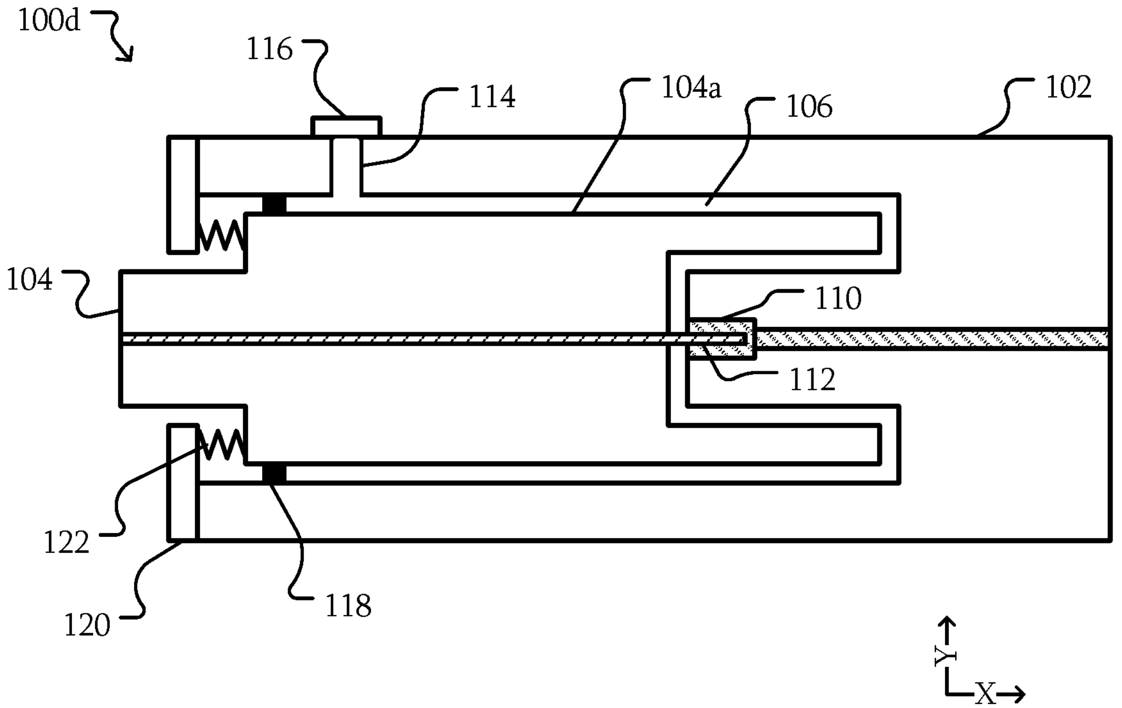
FIG. 3D is a block diagram of a connector assembly with a mechanical stop and a spring according to some embodiments.

FIG. 3D is a block diagram of a connector assembly with a mechanical stop and a spring according to some embodiments. The connector assembly 100*d* may be similar to the connector assembly 100*c*. However, the connector assembly 100*d* includes a spring 122 or other resilient mechanism. The spring 122 can be configured to apply pressure to reduce the volume of the sealable fluid chamber 106. Then pressure is applied by the spring 122, a probability of an expansion of any void in the sealable fluid chamber 106 is reduced. For example, when a connector cools down, a difference in thermal expansion between the materials of the connector housings 102 and 104 and the material of a fluid in the sealable fluid chamber 122 may cause a void in the sealable fluid chamber to expand. However, the force of the spring 122 may overcome friction between the connector housings 102 and 104, causing the volume of the sealable fluid chamber 106 to decrease and, consequently, decrease the size of any voids. In this example, a spring 122 is coupled between the mechanical stop 120 and the second connector housing 104. In some embodiments, the spring 122 has dimensions such that the spring 122 is under compression through all positions of the second connector housing 104 within the first connector housing 102 as limited by the mechanical stop 120.

In some embodiments, the mechanical stop 120 and the spring 122 may form part of an electrical connection between the first connector housing 102 and the second connector housing 104. For example, the mechanical stop 120 and the spring 122 may include electrically conductive materials. The first connector housing 102 may electrically contact the mechanical stop 120. The mechanical stop 120 may electrically contact the spring 122. The spring 122 may electrically contact the second connector housing 104, forming the electrical connection between the first connector housing 102 and the second connector housing 104, which may improve the electrical performance and/or coupling between the first connector housing 102 and the second connector housing 104.

While the spring 122 may include an electrically conductive material, in other embodiments, the spring may include an insulating material. The spring 122 may not form part of an electrical connection between the first connector housing 102 and the second connector housing 104. However, the spring 122 may still apply pressure as described above.

Figure 3E:
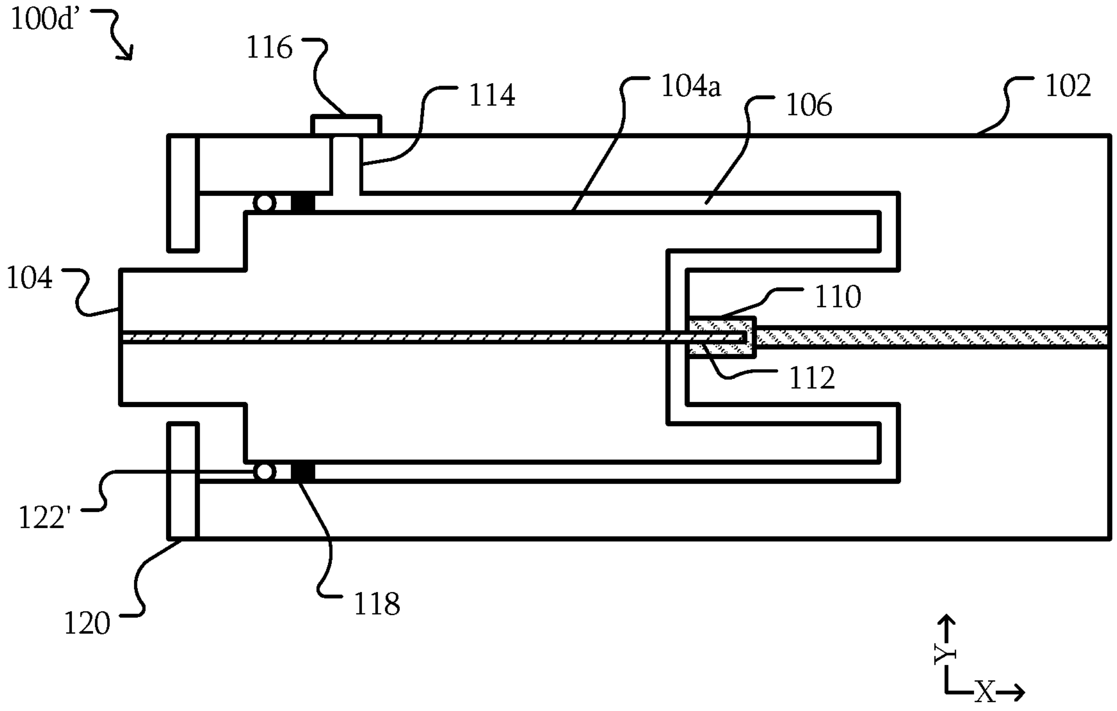
FIG. 3E is a block diagram of a connector assembly with a mechanical stop and a spring according to some other embodiments.

FIG. 3E is a block diagram of a connector assembly with a mechanical stop and a spring according to some other embodiments. The connector assembly 100*d*' may be similar to the connector assembly 100*d*. However, a different type of spring 122' may be included. In some embodiments, the spring 122' may include a garter spring disposed around a portion of the second connector housing 104. The spring 122' may be disposed on a side of the seal 118 outside of the sealable fluid chamber 106. However, in other embodiments, a spring 122' may be disposed inside of the sealable fluid chamber 106 or in on both sides.

Figure 4A:
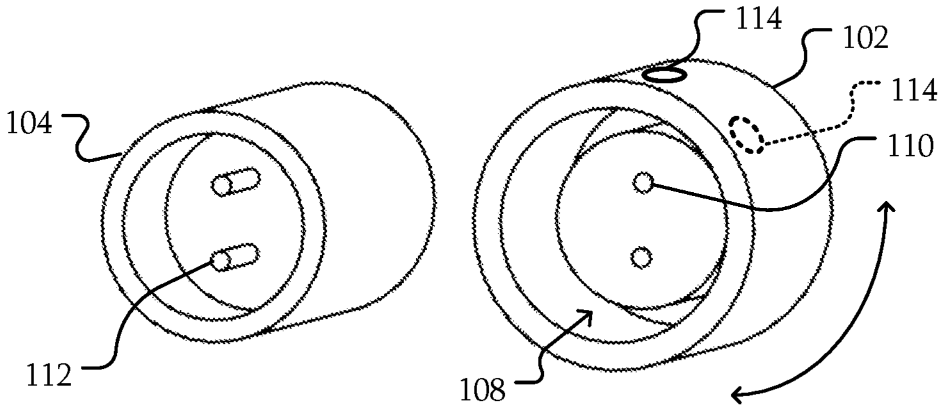
FIGS. 4A-4B are perspective views of connector housings of a connector assembly with different cross-sections according to some embodiments.
Figure 4B:
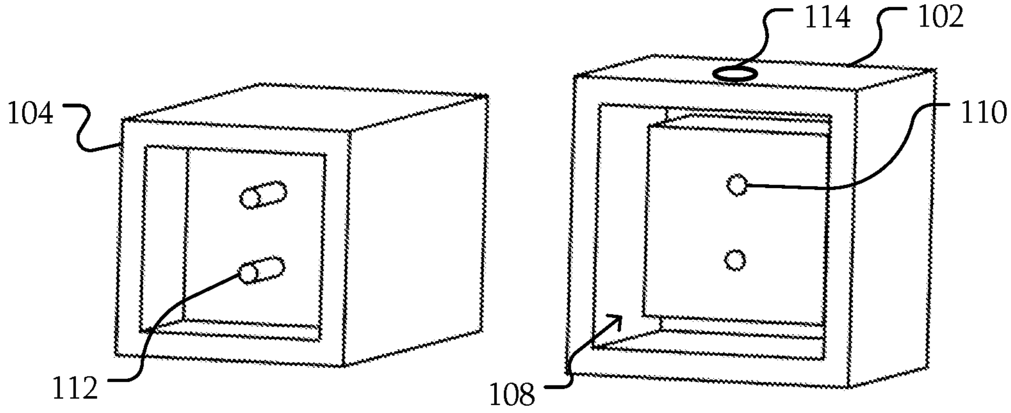

FIGS. 4A-4B are perspective views of connector housings of a connector assembly with different cross-sections according to some embodiments. Referring to FIG. 4A, in some embodiments, the first connector housing 102 and the second connector housing 104 may have generally circular or elliptical cross-sections. In some embodiments, the first connector housing 102 or other similar structure including the sealable vent 114 may be rotatable as indicated by the arrows. The dashed sealable vent 114 indicates a position of the sealable vent 114 before rotation. The solid sealable vent 114 indicates a position after rotating the first connector housing 102. As will be described in further detail below a variety of structures may be rotated to put the sealable vent 114 in a desired position.

Referring to FIG. 4B, in some embodiments, the first connector housing 102 and the second connector housing 104 may have generally rectangular cross-sections. While circular and rectangular cross-sections have been used as examples, in other embodiments, the cross-sections may be different.

Figure 5A:
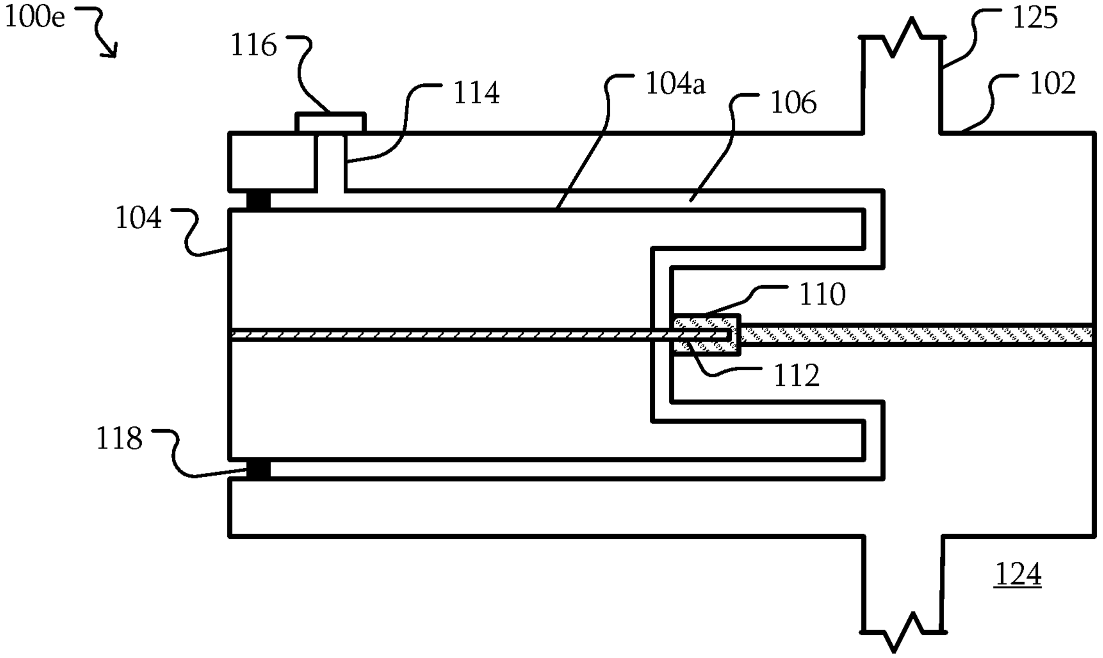
FIGS. 5A and 5B are block diagrams of connector assemblies mounted on vacuum enclosures according to some embodiments.
Figure 5B:
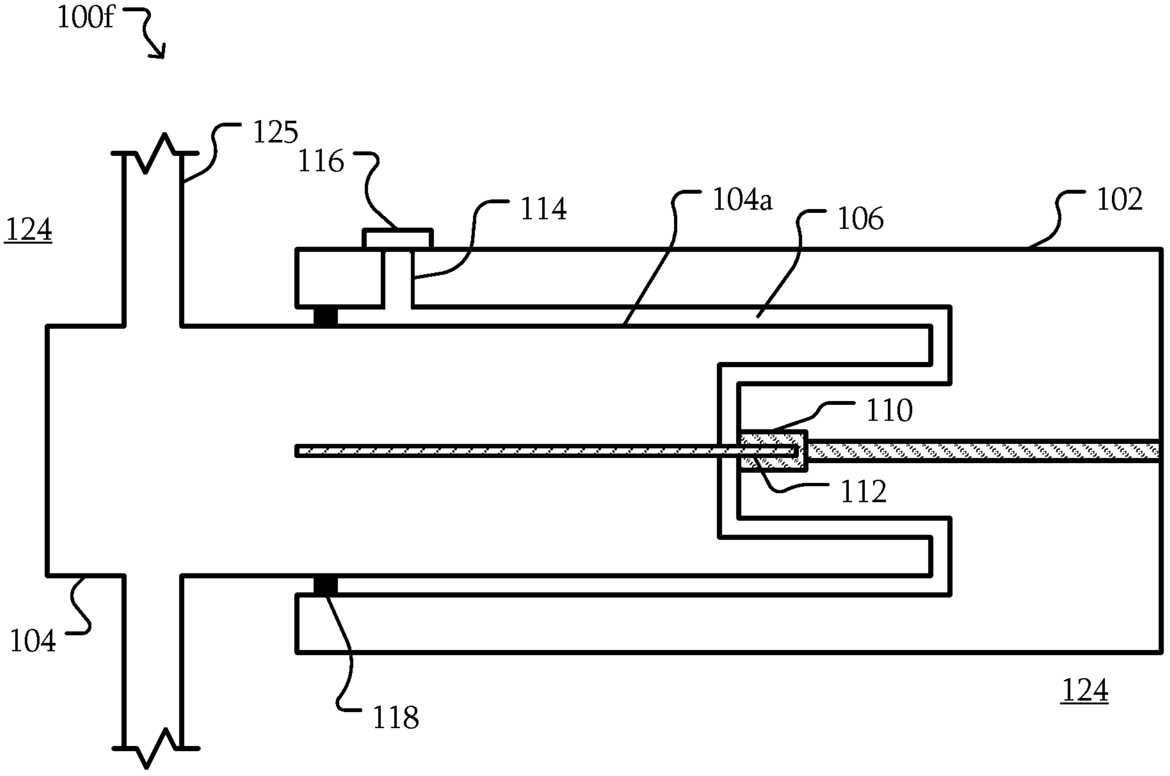

FIGS. 5A and 5B are block diagrams of connector assemblies mounted on vacuum enclosures according to some embodiments. Referring to FIG. 5A, the connector assembly 100*e* may be similar to the connector assemblies 100*a*-100*d* described above. In some embodiments, the connector assembly 100*e* may be coupled to a wall 125 of a vacuum enclosure 124. For example, the base 111 or sidewall 109, or other structure of the first connector housing 102 may be welded, brazed, or otherwise attached to the wall 125 to create a vacuum compatible seal.

Referring to FIG. 5B, the connector assembly 100*f* may be similar to the connector assemblies 100*a*-100*d* described above. While the first connector housing 102 has been used as an example of a component that forms part of the housing of a wall 125 of the vacuum enclosure 124, in other embodiments, the second connector housing 104 may form part of the wall 125 of the vacuum enclosure 124. For example, the second connector housing 104 may be welded, brazed, or otherwise attached to the wall 125 to create a vacuum compatible seal. While a vacuum enclosure is used as an example, in other embodiments, the connector assemblies described herein may be installed on other structures, including an oil enclosure, a potting enclosure, or the like.

Figure 6A:
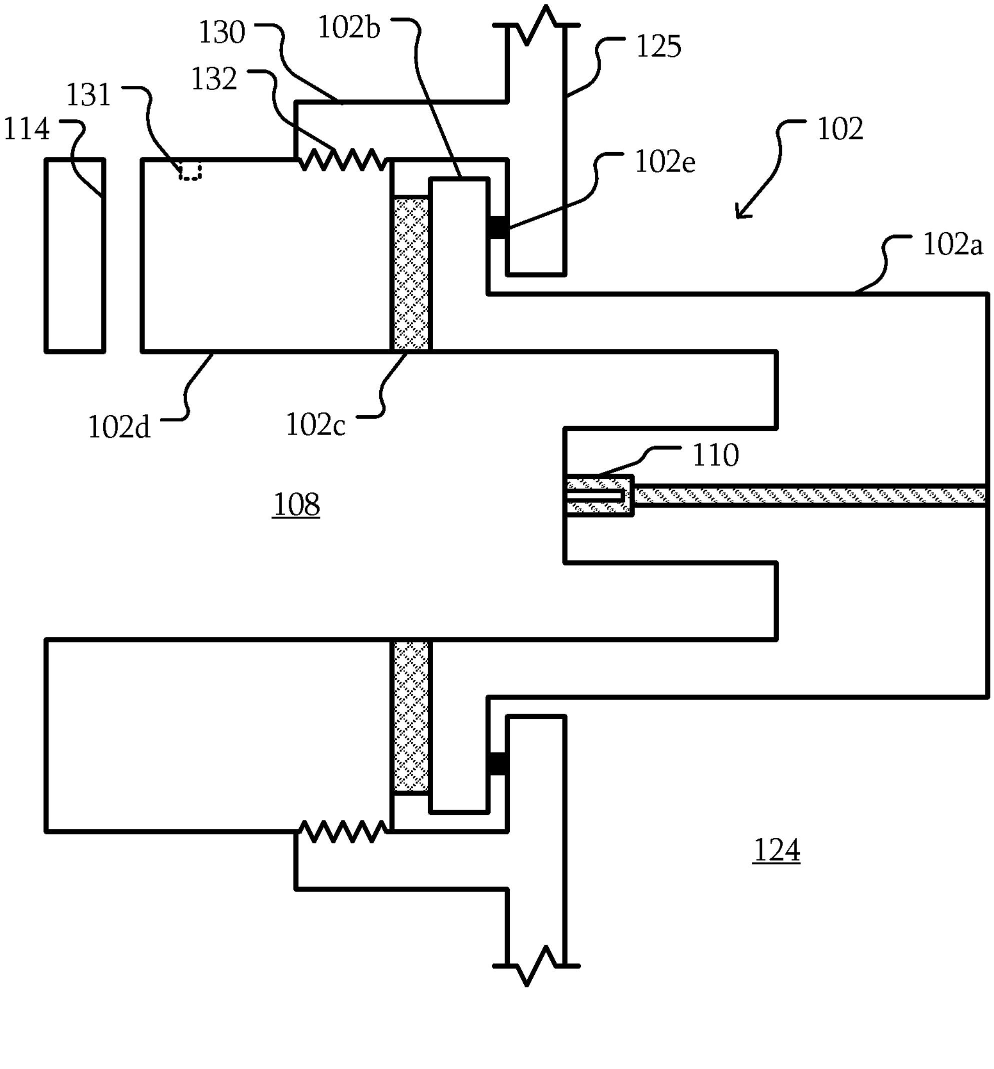
FIGS. 6A-6C are block diagrams of connector housings according to some embodiments.
Figure 6B:
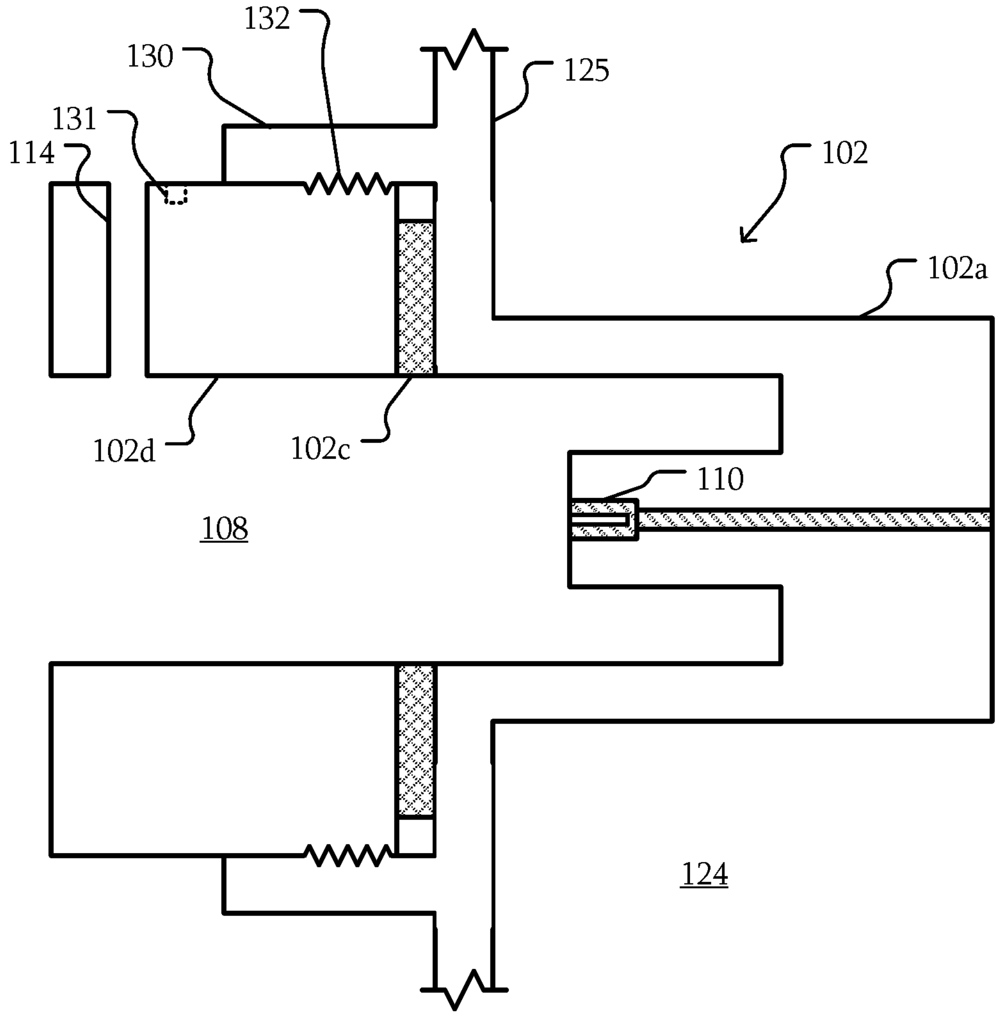
Figure 6C:
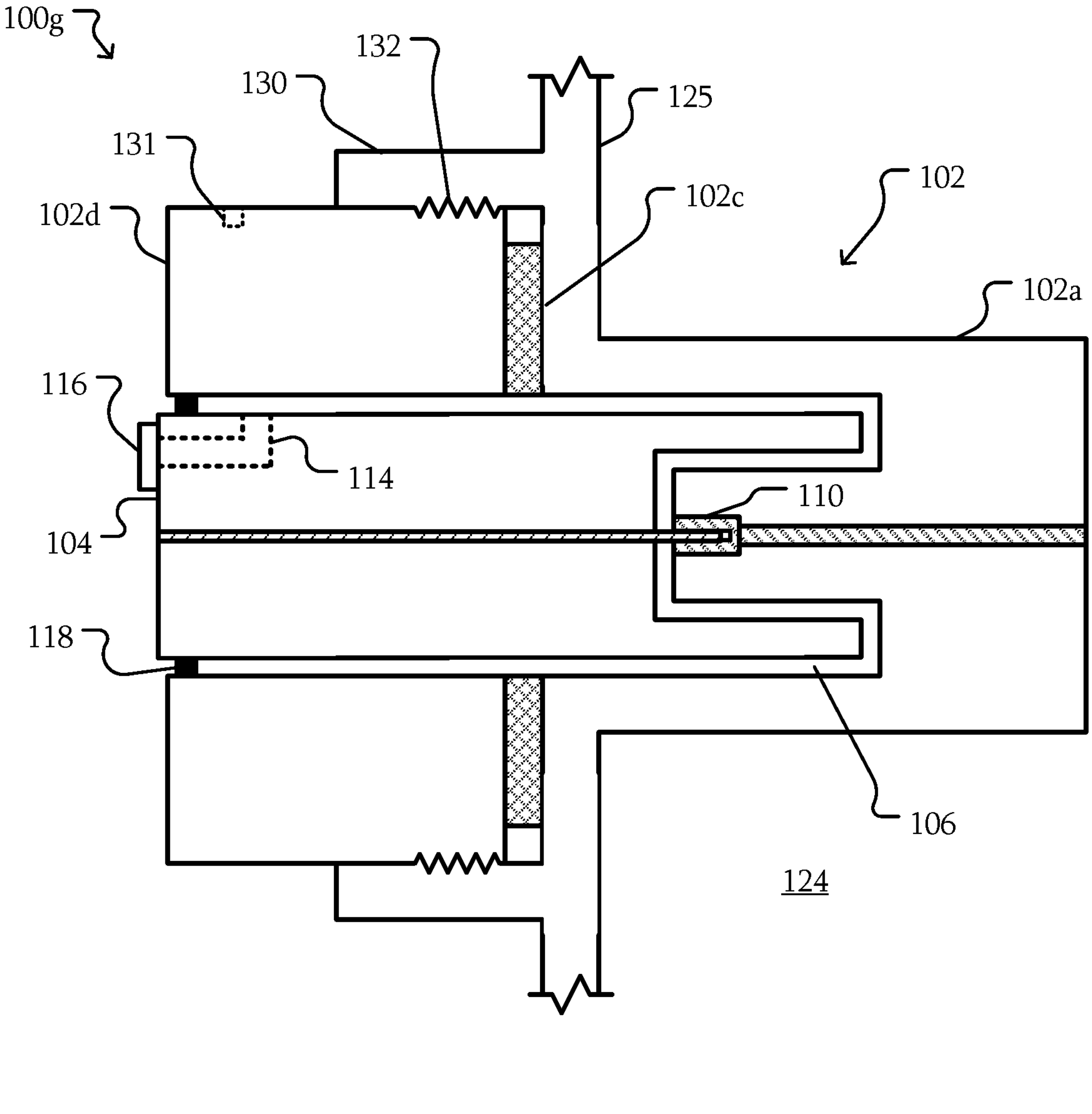

FIGS. 6A-6C are block diagrams of a connector housings according to some embodiments. In some embodiments, the connector housings of FIGS. 6A-6C may be part of a newly manufactured system; however, in other embodiments, the connector assemblies may be retrofit on to existing systems. Referring to FIG. 6A, in some embodiments, a system may have a preexisting opening formed by a wall 130 coupled to a wall 125 of a vacuum enclosure 124. The wall 130 may include a threaded surface 132.

A first connector housing 102 may include a first sub-housing 102*a* including a flange 102*b*, a thrust ring 102*c*, and a second sub-housing 102*d*. The second sub-housing 102*d* may be threaded to interface with the threaded surface 132 of the wall 130. When assembled, the second sub-housing 102*d* may apply pressure to the flange 102*b* through the thrust ring 102*c*. A seal 102*e* may be disposed between the flange 102*b* and the wall 125 to create a vacuum compatible seal. The second sub-housing 102*d* may include the sealable vent 114 similar to that described above. The combined structure of the first connector housing 102 may be configured to receive a second connector housing 104 as described above to create the connector assembly.

As the second sub-housing 102*d* may be rotatable, the sealable vent 114 may be rotated to the highest position. As a result, the probability that voids will migrate to the sealable vent 114 may be improved. In some embodiments, notches, grooves, protrusions, ridges, knurls, or other mechanical features 131 may be present on the second sub-housing 102*d*. The mechanical features 131 may allow for ease of rotating the second sub-housing 102*d* to align the sealable vent 114 as desired.

Referring to FIG. 6B, in some embodiments, the system may be similar to the described with respect to FIG. 6A. However, the first sub-housing 102*a* may be integrated with the wall 125. For example, the first sub-housing 102*a* may be welded, brazed, bolted, or otherwise sealed in a vacuum compatible manner to the wall 125. The first sub-housing 102*a* may form part of a vacuum enclosure. The second sub-housing 102*d* may similarly apply pressure to the integrated wall 125 and first sub-housing 102*a* through the thrust ring 102*c*. The thrust ring 102*c* may be formed of a material such as silicone or other vacuum compatible resilient materials, such that it forms a vacuum seal when compressed. Accordingly, the connector assembly may be retrofit without breaking the vacuum.

Referring to FIG. 6C, in some embodiments, the connector assembly 100*g* may be similar to the connector assembly described with respect to FIG. 1E. The second connector housing 104 may include the sealable vent similar to the second connector housing 102 described with respect to FIG. 1E. The first connector housing 102 may be similar to that of FIG. 6A or 6B. The second connector housing 104 may be rotatable to position the sealable vent 114 at the highest position. While the sealable vent 114 is illustrated as having the seal 116 at a lower position in its current orientation relative to the sealable fluid chamber 106, in other embodiments, the installation position of the connector assembly 100*g*, the structures of the second connector housing 104, or the like may allow the positioning of the end of the sealable vent 114 to be higher than the sealable fluid chamber 106.

Figure 7:
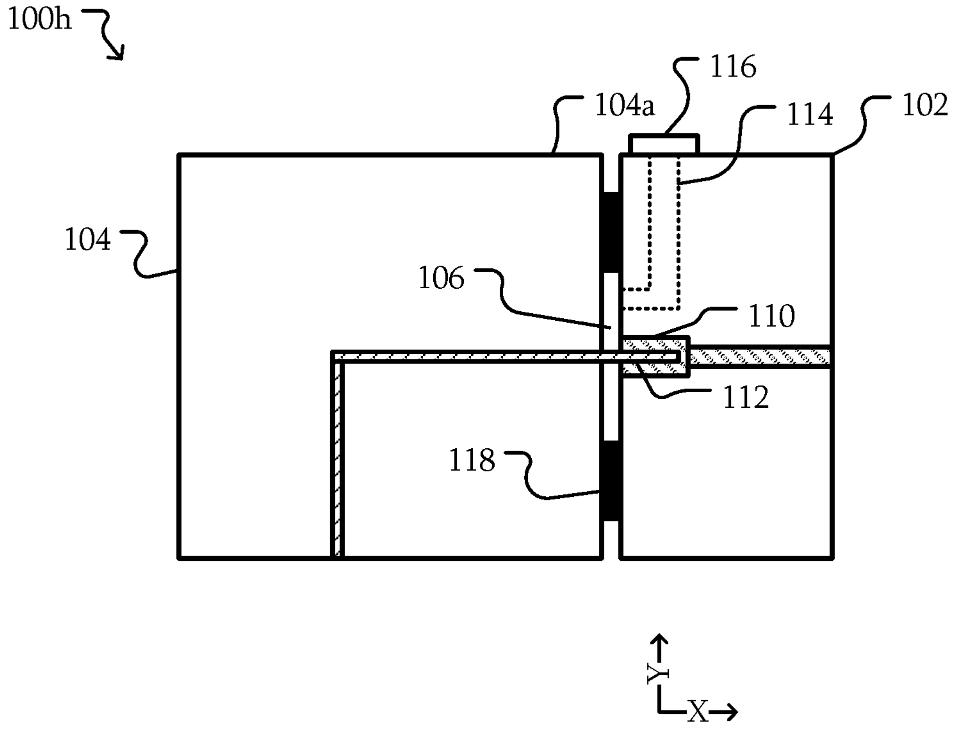
FIG. 7 is a block diagram of a flat or pancake connector assembly according to some embodiments.

FIG. 7 is a block diagram of a flat or pancake connector assembly according to some embodiments. In some embodiments, the connector assembly 100*g* includes first and second connector housing 102 and 104. The first and second connector housings 102 and 104 may be similar to those described above. However, the connector assembly 100*h* is a flat or pancake connector assembly. The seal 118 may be disposed to be axially compressed in the X direction between the first and second connector housings 102 and 104. The sealable fluid chamber 106 may be bounded at least in part by the first and second connector housings 102 and 104 and the seal 118. Axial movement in the X direction may change the volume of the sealable fluid chamber 106.

Figure 8:
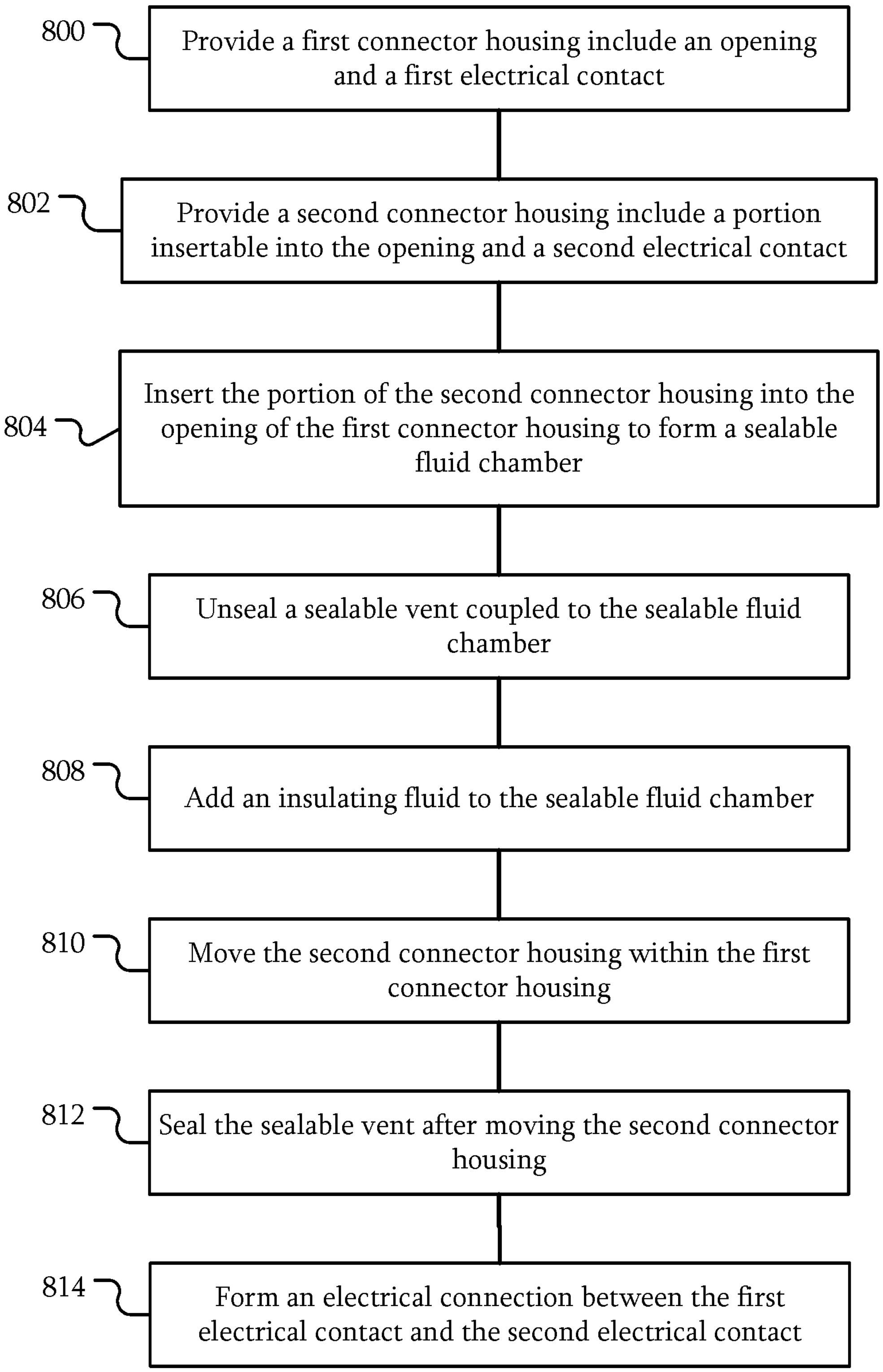
FIG. 8 is a flowchart of a technique of connecting a connector assembly according to some embodiments.
Figure 9A:
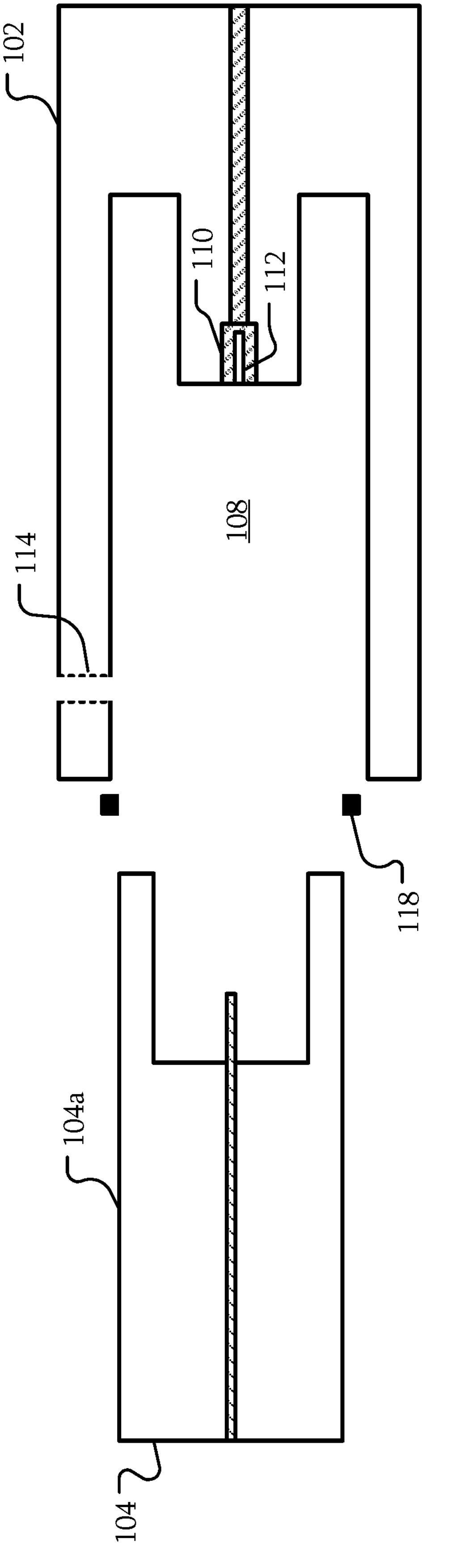
FIGS. 9A-9G are block diagrams of connector assemblies in various states according to some embodiments.

FIG. 8 is a flowchart of a technique of connecting a connector assembly according to some embodiments. FIGS. 9A-9G are block diagrams of connector assemblies in various states according to some embodiments. Referring to FIGS. 8 and 9A, in some embodiments, in 800, a first connector housing 102 including an opening 108 and a first electrical contact 110 is provided. In 802, a second connector housing 104 including a portion 104*a* insertable into the opening 108 and a second electrical contact 112 is provided. A seal 118 may also be provided. The seal 118 may already be attached to the first connector housing 102 or the second connector housing 104.

Figure 9B:
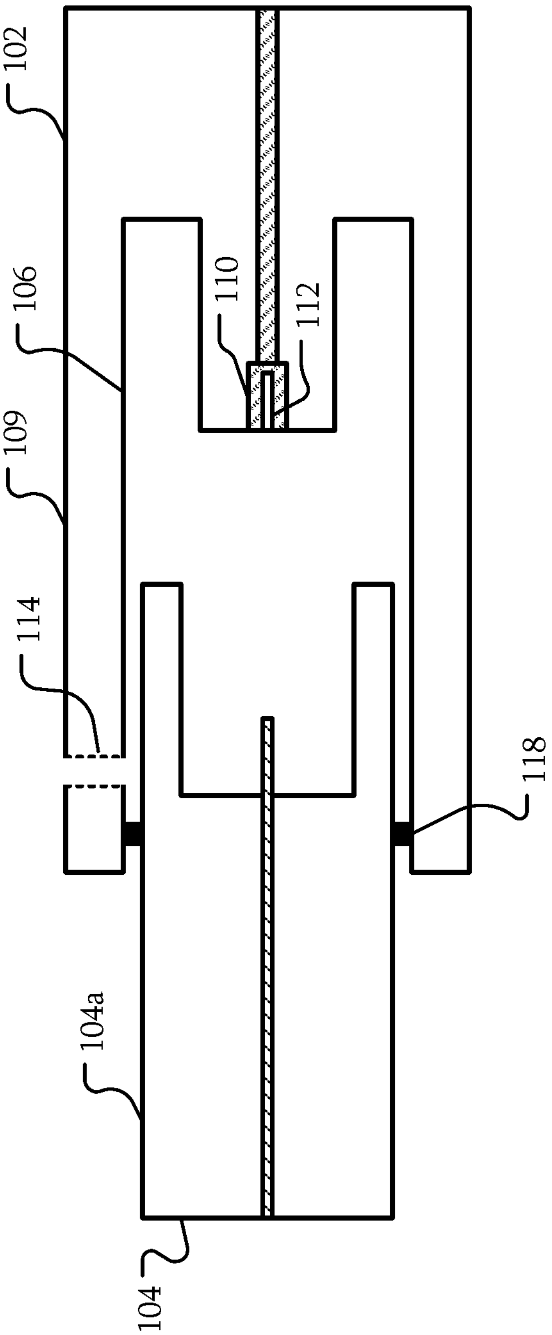

Referring to FIGS. 8 and 9B, in 804, the portion 104*a* of the second connector housing 104 is inserted into the opening 108 of the first connector housing 102 to form a sealable fluid chamber 106. Part of forming the sealable fluid chamber 106 may include inserting the seal 118 into the opening 108, attaching the seal 118 to the second connector housing 104, or the like such that a seal is formed between the sidewall 109 and the portion 104*a* of the second connector housing 104. The sealable fluid chamber 106 may be formed in 804 but not completely sealed. For example, the sealable vent 114 may be unsealed.

In 806, the sealable vent 114 coupled to the sealable fluid chamber 106 is unsealed. For example, a bleeder screw, other screw, or the like may be removed and/or loosened to allow access to the sealable vent 114. Although unsealing the sealable vent 114 may occur after inserting the second connector housing 104 in 804, in other embodiments, the sealable vent 114 may be unsealed before inserting the portion 104*a* of the second connector housing 104 is inserted into the opening 108 of the first connector housing 102. In other embodiments, the sealable vent 114 may be formed unsealed and 806 may be omitted.

Figure 9C:
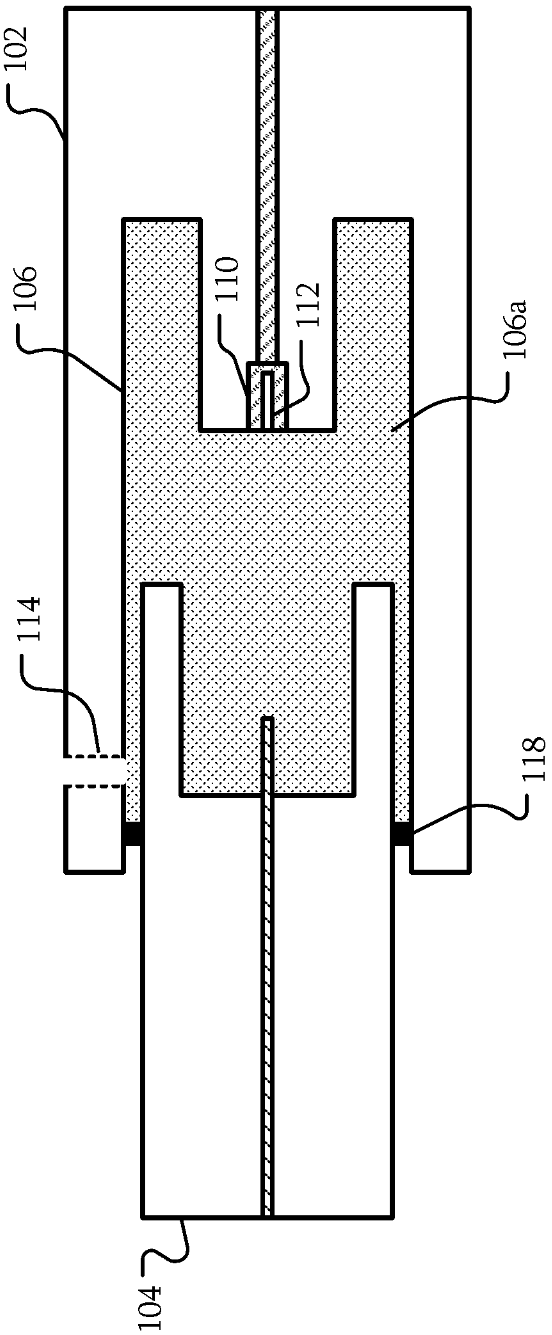

Referring to FIGS. 8 and 9C, in some embodiments, in 808, an insulating fluid 106*a* is added to the sealable fluid chamber 106. For example, the insulating fluid 106*a* may be added through the sealable vent 114. In other embodiments, the insulating fluid 106*a* may be added through another sealable vent, opening, or the like, such as through a sealable vent in the second connector housing 104, a second vent in the first connector housing 102 or the second connector housing 104, or the like.

While the second connector housing 104 is illustrated at a particular position within the first connector housing 102 when the insulating fluid 106*a* is added, in other embodiments, the second connector housing 104 may be in a different position. For example, the second connector housing 104 may be in a position that is outside of a range of motion that would otherwise be limited by a mechanical stop 120 as described with respect to FIG. 3B. Accordingly, a volume of insulating fluid 106*a* that is added may be greater than a maximum of the volume of the sealable fluid chamber 106 when limited by the mechanical stop 120.

Figure 9D:
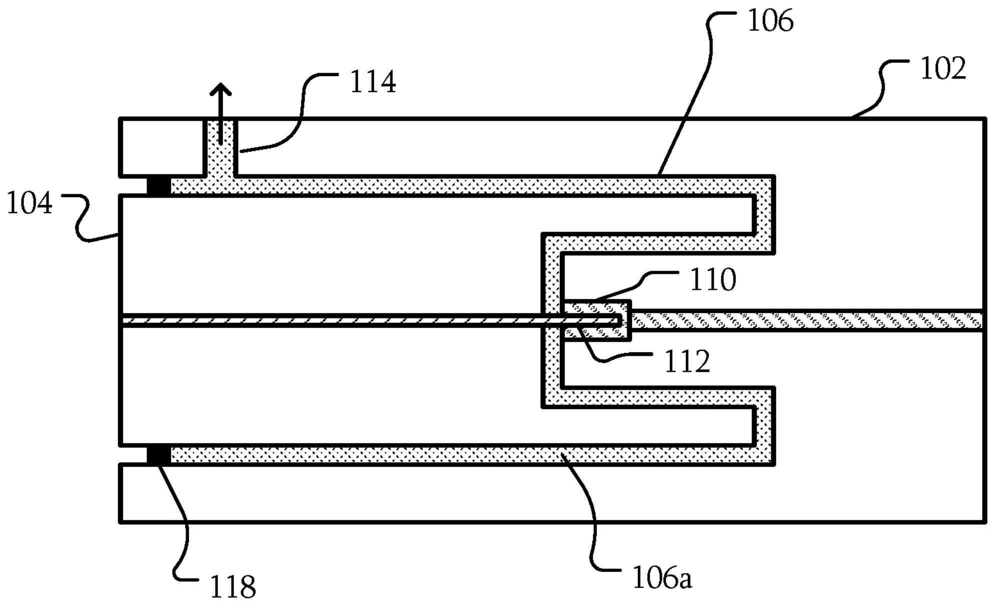

Referring to FIGS. 8 and 9D, in 810, the second connector housing 104 is moved within the first connector housing 102. In some embodiments, the second connector housing 104 is inserted into the first connector housing 102 until the insulating fluid 106*a* escapes from the sealable vent 114.

Figure 9E:
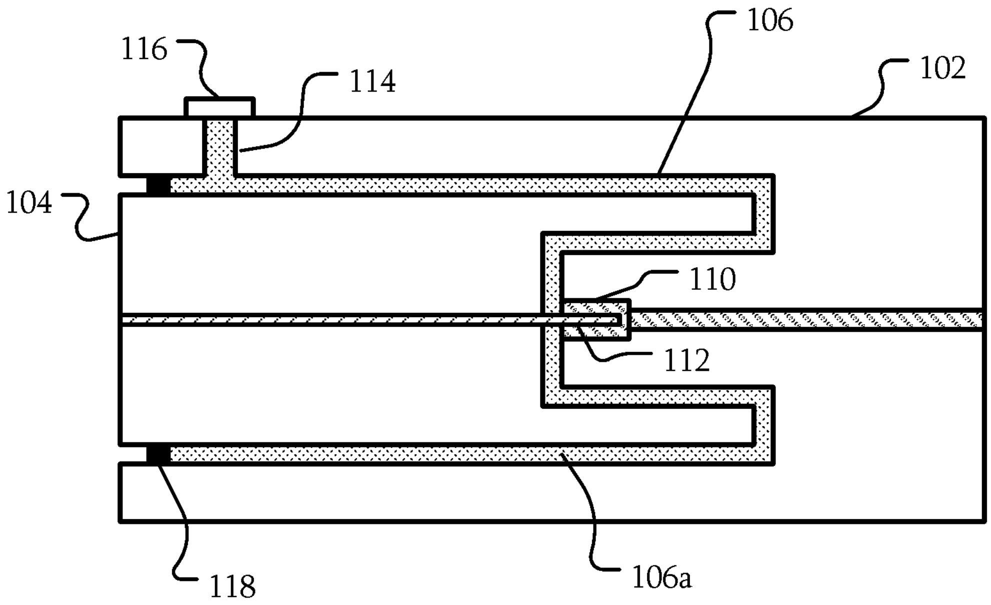

Referring to FIGS. 8 and 9E, in 812, the sealable vent 114 is sealed after moving the second connector housing 104. In some embodiments, the second connector housing 104 is moved only to decrease the volume of the sealable fluid chamber 106 before sealing the sealable vent 114. However, as will be described below, in other embodiments, the second connector housing 104 may be manipulated differently before and after sealing the sealable vent 114.

In 814, an electrical connection is formed between the first electrical contact 110 and the second electrical contact 112. In some embodiments, the electrical connection may be formed as the second connector housing 104 is inserted in 804. The electrical connection may be formed before the insulating fluid 106*a* is added. In other embodiments, the electrical connection may be formed at different times.

Figure 9F:
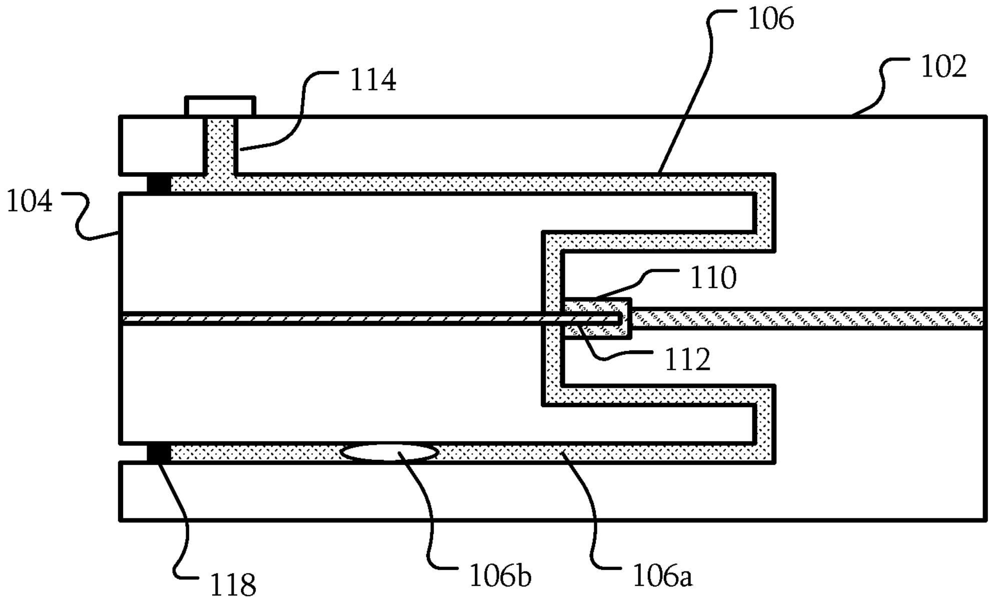
Figure 9G:
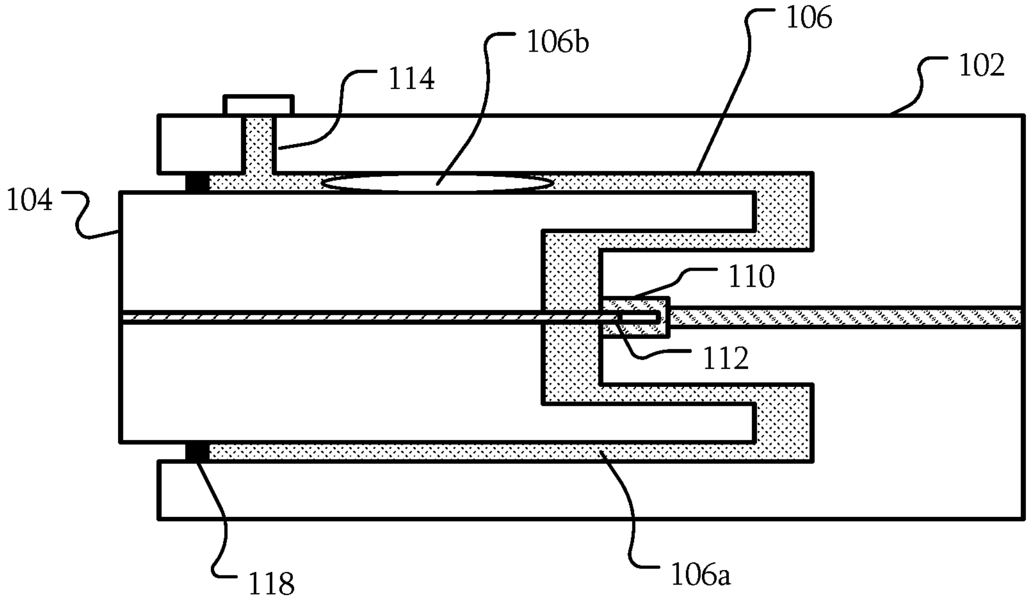

Referring to FIGS. 8, 9F, and 9G, in some embodiments, the second connector housing 104 may be moved to increase a volume of the sealable fluid chamber 106. For example, in FIG. 9F, after the sealable vent 114 is sealed, a void 106*b* may be present in the sealable fluid chamber 106. As described above, this void 106*b* may lead to a failure due to the lower breakdown voltage.

While the sealable vent 114 is sealed, the second connector housing 104 may be moved. The movement increases the volume of the sealable fluid chamber 106. While the volume of the insulating fluid 106*a* may not increase significantly, the volume of the void 106*b* may increase significantly. The larger void 106*b* may migrate through the sealable fluid chamber 106 to the sealable vent 114. The sealable vent 114 may be unsealed, allowing the void to escape.

This process may be repeated multiple times. In some embodiments, the sealing of the sealable vent 114, the moving of the second connector housing 104 within the first connector housing 102, the unsealing the sealable vent, the moving of the second connector housing 104 within the first connector housing 102 until insulating fluid 106*a* escapes through the sealable vent 114, and the sealing of the sealable vent 114 may be repeated until a force to move the second connector housing 104 within the first connector housing 102 while the sealable vent is sealed exceeds a threshold. The threshold may be 5 kilograms (kg), 10 kg, 20 kg, or more. The threshold may depend on the size of the connector housings 102 and 104 with a lower threshold being used for connector housings with smaller cross-sectional areas. Reaching or exceeding the threshold pressure may indicate that the voids which can cause arcing and other damage to the connector assembly are substantially eliminated or removed.

In some embodiments, the process may be repeated a number of times. For example, the process may be repeated for three or more times. The number of times may be selected to ensure that any remaining voids are eliminated or reduced to increase a reliability of the connector assembly. The number of repetitions may be used instead of relying on the force to move the second connector housing 104.

In some embodiments, a vacuum pump may not be needed to form a connection. For example, the relative movement of the connector housings 102 and 104 may be sufficient to cause a sufficient amount of any voids to migrate to the sealable vent 114 and be expellled before sealing the sealable vent 114.

In the various embodiments described above, connector assembly 100, such as connector assemblies 100*a*-100*f* or the like, may be oriented such that the sealable vent 114 is the highest point of the sealable fluid chamber 106. In some embodiments, in this orientation, the sealable vent 114 may be the only maximum point in the sealable fluid chamber 106. That is, in that orientation, the sealable fluid chamber 106 may have no local maxima other than the sealable vent 114. As a result, any void 106*b* or the like may migrate towards the sealable vent 114.

In some embodiments, the sealable vent 114 may have a shape that aids in the movement of voids 106*b* or the like. For example, the connector assembly 100*a*-100*f* or the like may have a particular expected orientation when installed, particularly when installed on a system that may be difficult to move or rotate. The sealable vent 114 shape and position may be configured to aid the migration of voids. For example, the sealable vent 114 may have an angle of about 45 degrees from the insertion direction.

In some embodiments, when using a first connector assembly 102 of FIG. 6, the first sub-housing 102*d* may be rotated until the sealable vent 114 is installed in a position to aid in the migration of voids 106*b* or the like.

In some embodiments, the sealable vent 114 may be sealed with a fastener having the same head as other fasteners used to attach the connector assembly 100. For example, a screw used to seal the sealable vent 114 and screws used to assemble the connector assembly 100 may have T20 Torx heads. While a particular type of fastener has been used as an example, in other embodiments, different fasteners may be used.

Figure 10:
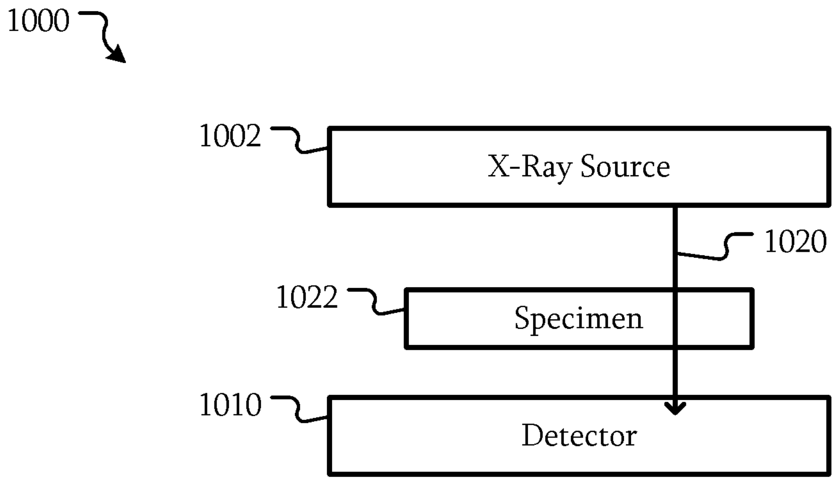
FIG. 10 is a block diagram of a 2D x-ray imaging system according to some embodiments.

FIG. 10 is a block diagram of a 2D x-ray imaging system according to some embodiments. The 2D x-ray imaging system 1000 includes an x-ray source 1002 and detector 1010. The x-ray source 1002 may include a connector assembly such as connector assemblies 100*a*-100*f* or the like as described above. The x-ray source 1002 is disposed relative to the detector 1010 such that x-rays 1020 may be generated to pass through a specimen 1022 and detected by the detector 1010. In some embodiments, the detector 1010 is part of a medical imaging system. In other embodiments, the 2D x-ray imaging system 1000 may include a portable vehicle scanning system as part of a cargo scanning system.

Some embodiments include an assembly, comprising: a first connector housing 102 including an opening and a first electrical contact 110; a second connector housing 104 including a portion insertable into the opening and a second electrical contact 112 electrically interfaceable with the first electrical contact 110; a seal 118 configured to form a sealable fluid chamber 106 with the first connector housing 102 and the second connector housing 104 when the portion of the second connector housing 104 is inserted into the opening of the first connector housing 102; and a sealable vent 114 coupled to the sealable fluid chamber 106 when the portion of the second connector housing 104 is inserted into the opening of the first connector housing 102; wherein, when the sealable fluid chamber 106 is formed: the portion of the second connector housing 104 is movable within the opening; and the volume of the sealable fluid chamber 106 changes as the portion of the second connector housing 104 moves within the opening.

In some embodiments, the sealable vent 114 penetrates the first connector housing 102.

In some embodiments, the sealable vent 114 penetrates the second connector housing 104.

In some embodiments, the sealable vent 114 is rotatable relative to at least one of the first connector housing 102 and the second connector housing 104.

In some embodiments, the assembly further comprises a mechanical stop 120 coupled to the first connector housing 102 such that movement of the portion of the second connector housing 104 within the opening is limited by the mechanical stop 120.

In some embodiments, the assembly further comprises a spring coupled between the mechanical stop 120 and the second connector housing 104 and configured to apply pressure to reduce the volume of the sealable fluid chamber 106.

In some embodiments, the sealable fluid chamber 106 is maintained in all positions of the portion of the second connector housing 104 within the opening when limited by the mechanical stop 120.

In some embodiments, a major axis of movement of the portion of the second connector housing 104 within the opening is aligned with an axis of insertion of the portion of the second connector housing 104 into the opening.

In some embodiments, the first connector housing 102 and the second connector housing 104 are configured such that rotation of the portion of the second connector housing 104 within the opening changes the volume of the sealable fluid chamber 106.

In some embodiments, a volume of the sealable fluid chamber 106 is less than about 10 milliliters (ml).

In some embodiments, the assembly further comprises a vacuum enclosure wherein one of the first connector housing 102 and the second connector housing 104 forms part of a wall of the vacuum enclosure.

Some embodiments include a method, comprising: providing a first connector housing 102 including an opening and a first electrical contact 110; providing a second connector housing 104 including a portion insertable into the opening and a second electrical contact 112; inserting the portion of the second connector housing 104 into the opening of the first connector housing 102 to form a sealable fluid chamber 106; adding an insulating fluid 106*a* to the sealable fluid chamber 106; moving the second connector housing 104 within the first connector housing 102; sealing the sealable vent 114 after moving the second connector housing 104; and forming an electrical connection between the first electrical contact 110 and the second electrical contact 112.

In some embodiments, sealing the sealable vent 114 after moving the second connector housing 104 comprises sealing the sealable vent 114 after the insulating fluid 106*a* escapes from the sealable fluid chamber 106 while moving the second connector housing 104 within the first connector housing 102.

In some embodiments, moving the second connector housing 104 within the first connector housing 102 comprises moving the second connector housing 104 to increase a volume of the sealable fluid chamber 106.

In some embodiments, the method further comprises sealing the sealable vent 114 before moving the second connector housing 104 to increase the volume of the sealable fluid chamber 106.

In some embodiments, the method further comprises unsealing the sealable vent 114 to vent the sealable fluid chamber 106.

In some embodiments, the method further comprises sealing the sealable vent 114; moving the second connector housing 104 within the first connector housing 102; unsealing the sealable vent 114; moving the second connector housing 104 within the first connector housing 102 until fluid escapes through the sealable vent 114; and sealing the sealable vent 114.

In some embodiments, the method further comprises repeatedly: sealing the sealable vent 114; moving the second connector housing 104 within the first connector housing 102; unsealing the sealable vent 114; moving the second connector housing 104 within the first connector housing 102 until fluid escapes through the sealable vent 114; and sealing the sealable vent 114; until a force to move the second connector housing 104 within the first connector housing 102 while the sealable vent 114 is sealed exceeds 10 kilograms (kg).

Some embodiments include an assembly, comprising: means for housing a first electrical contact; means for housing a second electrical contact; means for sealing a sealable fluid chamber formed by the means for housing a first electrical contact and the means for housing a second electrical contact; and means for maintaining an electrical connection between the first electrical contact and the second electrical contact while the sealable fluid chamber is formed; wherein the volume of the sealable fluid chamber changes as the means for housing the second electrical contact moves within the means for housing the first electrical contact while the sealable fluid chamber is formed.

Examples of the means for housing a first electrical contact include the first connector housing 102.

Examples of the means for housing a second electrical contact include the second connector housing 104.

Examples of the means for sealing a sealable fluid chamber formed by the means for housing a first electrical contact and the means for housing a second electrical contact include the seals 116 and 118.

Examples of the means for maintaining an electrical connection between the first electrical contact and the second electrical contact while the sealable fluid chamber is formed include the interface between the first electrical contact 110 and the second electrical contact 112.

In some embodiments, the assembly further comprises means for retaining the means for housing the second electrical contact within the means for housing the first electrical contact. Examples of the means for retaining the means for housing the second electrical contact within the means for housing the first electrical contact include the mechanical stop 120.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claims 1, 3, or 4, with these separate dependencies yielding three distinct embodiments; claim 6 can depend from any one of claims 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An assembly, comprising:

a first connector housing including an opening and a first electrical contact;

a second connector housing including a portion insertable into the opening and a second electrical contact electrically interfaceable with the first electrical contact;

a seal configured to form a sealable fluid chamber with the first connector housing and the second connector housing when the portion of the second connector housing is inserted into the opening of the first connector housing; and a sealable vent coupled to the sealable fluid chamber when the portion of the second connector housing is inserted into the opening of the first connector housing;

wherein, when the sealable fluid chamber is formed:

the portion of the second connector housing is movable within the opening; and the volume of the sealable fluid chamber changes as the portion of the second connector housing moves within the opening.

2. The assembly of claim 1, wherein:

the sealable vent penetrates the first connector housing.

3. The assembly of claim 1, wherein:

the sealable vent penetrates the second connector housing.

4. The assembly of claim 1, wherein:

the sealable vent is rotatable relative to at least one of the first connector housing and the second connector housing.

5. The assembly of claim 1, further comprising:

a mechanical stop coupled to the first connector housing such that movement of the portion of the second connector housing within the opening is limited by the mechanical stop.

6. The assembly of claim 5, further comprising:

a spring coupled between the mechanical stop and the second connector housing and configured to apply pressure to reduce the volume of the sealable fluid chamber.

7. The assembly of claim 5, wherein:

the sealable fluid chamber is maintained in all positions of the portion of the second connector housing within the opening when limited by the mechanical stop.

8. The assembly of claim 1, wherein:

a major axis of movement of the portion of the second connector housing within the opening is aligned with an axis of insertion of the portion of the second connector housing into the opening.

9. The assembly of claim 1, wherein:

the first connector housing and the second connector housing are configured such that rotation of the portion of the second connector housing within the opening changes the volume of the sealable fluid chamber.

10. The assembly of claim 1, wherein:

a volume of the sealable fluid chamber is less than about 10 milliliters (ml).

11. The assembly of claim 1, further comprising:

a vacuum enclosure wherein one of the first connector housing and the second connector housing forms part of a wall of the vacuum enclosure.

12. A method, comprising:

providing a first connector housing including an opening and a first electrical contact;

providing a second connector housing including a portion insertable into the opening and a second electrical contact;

inserting the portion of the second connector housing into the opening of the first connector housing to form a sealable fluid chamber;

adding an insulating fluid to the sealable fluid chamber;

moving the second connector housing within the first connector housing;

sealing the sealable vent after moving the second connector housing to seal the sealable fluid chamber; and forming an electrical connection between the first electrical contact and the second electrical contact.

13. The method of claim 12, wherein:

sealing the sealable vent after moving the second connector housing comprises sealing the sealable vent after the insulating fluid escapes from the sealable fluid chamber while moving the second connector housing within the first connector housing.

14. The method of claim 12, wherein:

moving the second connector housing within the first connector housing comprises moving the second connector housing to increase a volume of the sealable fluid chamber.

15. The method of claim 14, further comprising:

sealing the sealable vent before moving the second connector housing to increase the volume of the sealable fluid chamber.

16. The method of claim 15, further comprising:

unsealing the sealable vent to vent the sealable fluid chamber.

17. The method of claim 12, further comprising:

sealing the sealable vent;

moving the second connector housing within the first connector housing;

unsealing the sealable vent;

moving the second connector housing within the first connector housing until fluid escapes through the sealable vent; and sealing the sealable vent.

18. The method of claim 12, further comprising:

repeatedly:

sealing the sealable vent;

moving the second connector housing within the first connector housing;

unsealing the sealable vent;

moving the second connector housing within the first connector housing until fluid escapes through the sealable vent; and sealing the sealable vent;

until a force to move the second connector housing within the first connector housing while the sealable vent is sealed exceeds 10 kilograms (kg).

19. An assembly, comprising:

means for housing a first electrical contact;

means for housing a second electrical contact;

means for sealing a sealable fluid chamber formed when the means for housing the first electrical contact is inserted into the means for housing the second electrical contact; and means for maintaining an electrical connection between the first electrical contact and the second electrical contact while the sealable fluid chamber is formed;

wherein the volume of the sealable fluid chamber changes as the means for housing the first electrical contact moves within the means for housing the second electrical contact while the sealable fluid chamber is formed.

20. The assembly of claim 19, further comprising:

means for retaining the means for housing the second electrical contact within the means for housing the first electrical contact.

* * * * *